Patented Mar. 16, 1954

2,672,459

UNITED STATES PATENT OFFICE 2,672,459

THIOPHOSPHONIC ACID DERIVATIVES AND METHOD OF PREPARING THE SAME

Erwin Kuh, New Brunswick, and Richard L. Shepard, Somerville, N. J., assignors to American Cyanamid Company, New York, N. Y., a corporation of Maine No Drawing. Application January 8, 1952, Serial No. 265,544

6 Claims. (Cl. 260—239)

This invention relates to the preparation of new organic compounds. More particularly, it relates to thiophosphonic acid diamides and methods for their preparation.

Certain diamides of phosphonic acids have been described in the literature.

The compounds of the present invention, in contrast to those of the prior art, are N,N'-dialkylenimides of thiophosphonic acids which may be illustrated by the following general formula:

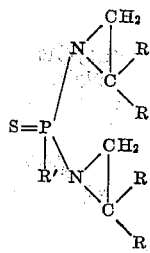

in which R is selected from the group of hydrogen, a radical of the aliphatic, aliphatic-aromatic, cycloaliphatic series, and R' is selected from the group of radicals of the aliphatic, cycloaliphatic, aliphatic-aromatic, heterocyclic and aromatic series.

Compounds of the present invention because of the reactive ethylenimine groups are also useful as new textile chemicals and may be polymerized to form new plastics.

The compounds of this invention are prepared by starting with a thiophosphonyl dichloride or dibromide, for example, ethanethiophosphonyl dichloride; beta-chloroethanethiophosphonyl dichloride; butanethiophosphonyl dichloride; cyclohexanethiophosphonyl dichloride; benzenethiophosphonyl dichloride; 4 - methylbenzenethiophosphonyl dichloride; 2-chlorobenzenethiophosphonyl dichloride; 1-naphthalenethiophosphonyl dichloride or 2-thiophenethiophosphonyl dichloride. These thiophosphonyl dihalides are reacted with two molecular equivalents of an ethylenimine compound which may contain one or more substituents on a ring carbon atom to produce the desired compound. This latter reaction may be illustrated by the following equation:

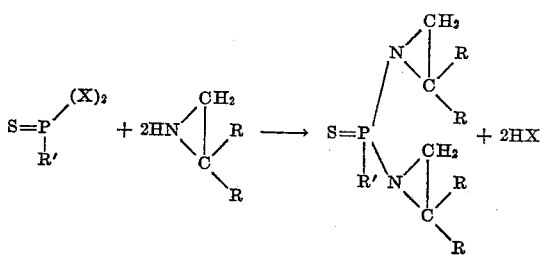

in which X is halogen and R and R' are as defined above. The ethylenimine compound may be, for example, ethylenimine itself or a C-substituted ethylenimine such as 2-methylethylenimine; 2-ethylethylenimine; 2,2-dimethylethylenimine; 2-propylethylenimine; 2,2-diethylethylenimine; 2-hexylethylenimine; etc. The ethylenimine intermediates may be prepared by known procedures such as treatment with sodium hydroxide of the corresponding 2-haloethylamines or of the sulfuric esters of the corresponding 2-hydroxyethylamines.

The reaction to prepare the compound of the present invention is preferably carried out in an inert organic solvent, for example, benzene, ether, dioxane or ethylene dichloride. It is necessary to have present as an acid acceptor a tertiary amine, for example, triethylamine or pyridine. With the more stable thiophosphonic chlorides the reaction can also be carried out in aqueous solution and under these circumstances, the acid acceptor may be an alkaline substance such as an alkali metal hydroxide or carbonate or bicarbonate. Isolation of the product from organic medium may be accomplished by filtration of the tertiary amine hydrohalide and crystallization from the organic solvent or by evaporation of the organic solvent. If prepared in aqueous medium, some members may be isolated by direct filtration. Others must be extracted from the aqueous medium with an organic solvent and subsequent evaporation of the organic solvent. The procedure will vary with the individual members according to their solubility properties.

The reaction is generally carried out at a temperature within the range of 0° C. to about 80° C. At this temperature range the reaction is generally complete within a period of several minutes to several hours.

The following example illustrates the preparation of representative thiophosphonamides of the present invention. All parts are by weight unless otherwise indicated.

Example

To a solution of 20.2 parts of triethylamine, 8.6 parts of ethylenimine in 125 parts of benzene is added with agitation, a solution of 21.1 parts of benzenethiophosphonyl dichloride in 45 parts of benzene at 5°–15° C. over a period of one and one-half hours. The reaction mixture is kept at room temperature for an additional two hours and the triethylamine hydrochloride is filtered off. Most of the benzene is removed from the filtrate under reduced pressure. The N,N'-diethylenbenzene phosphondiamide, crystallized from petroleum ether, is obtained in small white crystals, melting point 102.5°–103.5° C.

We claim:
1. Compounds of the group having the general formula:

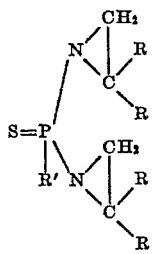

in which R is a member of the group consisting of hydrogen and lower alkyl radicals and R' is a member of the group consisting of lower alkyl, phenyl, lower alkylphenyl, chlorophenyl and naphthyl radicals.

2. Compounds of the group having the general formula:

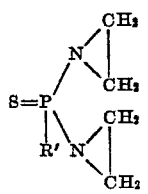

in which R' is a monocyclic aryl radical containing not more than eight carbon atoms.

3. N,N' - diethylene - benzenethiophosphondiamide having the formula:

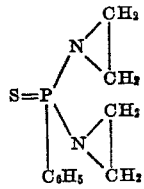

4. A method of preparing compounds having the formula:

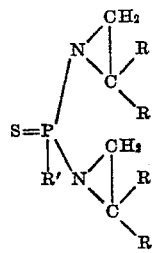

in which R is a member of the group consisting of hydrogen and lower alkyl radicals and R' is a member of the group consisting of lower alkyl, phenyl, lower alkylphenyl, chlorophenyl and naphthyl radicals which comprises reacting a compound having the formula:

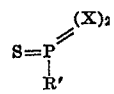

in which X is halogen of the atomic number between 17 and 35 and R' is as defined above with a compound having the formula:

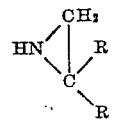

in which R is as defined above, and recovering said compound therefrom.

5. A method of preparing compounds having the formula:

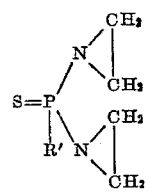

in which R' is a monocyclic aryl radical containing not more than eight carbon atoms which comprises reacting a compound having the formula:

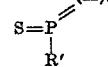

in which X is halogen of the atomic number between 17 and 35 and R' is as defined above, with ethylenimine, and recovering said compound therefrom.

6. A method of preparing N,N'-diethylenebenzenethiophosphondiamide which comprises reacting benzenethiophosphonyl dichloride with ethylenimine in an inert organic solvent in the presence of a tertiary amine and recovering said compound therefrom.

ERWIN KUH.
RICHARD L. SHEPARD.

References Cited in the file of this patent

Michaelis et al., Ber. Deut. Chem., vol. 31, p. 1042 (1898).

Michaelis, Liebigs Ann., vol. 326, p. 129 (1903).